(12) United States Patent
Dostert

(10) Patent No.: US 7,624,395 B2
(45) Date of Patent: Nov. 24, 2009

(54) THREAD-LEVEL RESOURCE USAGE MEASUREMENT

(75) Inventor: Jan Dostert, Nussoch (DE)

(73) Assignee: SAP AG, Walldorf (DE)

( * ) Notice: Subject to any disclaimer, the term of this patent is extended or adjusted under 35 U.S.C. 154(b) by 1082 days.

(21) Appl. No.: 10/949,543

(22) Filed: Sep. 23, 2004

(65) Prior Publication Data
US 2006/0064687 A1    Mar. 23, 2006

(51) Int. Cl.
*G06F 9/455*    (2006.01)
(52) U.S. Cl. .......................... 718/1; 718/100; 718/104
(58) Field of Classification Search ......... 709/223–226; 718/1, 100, 104
See application file for complete search history.

(56) References Cited

U.S. PATENT DOCUMENTS 6,829,772 B2* 12/2004 Foote et al. ................. 719/330
6,968,557 B1* 11/2005 Zhang et al. ................ 719/319
2003/0056200 A1* 3/2003 Li et al. ...................... 717/128
2004/0039758 A1* 2/2004 Li ............................... 707/206

OTHER PUBLICATIONS

Author: Godmar Back (University of Utah) Web document title: Process/Coroutine Package in Java Date: Dec. 1995 p. 2.*

* cited by examiner

*Primary Examiner*—Andy Ho
(74) *Attorney, Agent, or Firm*—Blakely, Sokoloff, Taylor & Zafman, LLP (57) ABSTRACT

Methods and apparatus, including computer program products, that implement thread-level resource usage measurement. A runtime system to run on top of a native operating system can be operable to perform operations including running threads; taking snapshots of usage of one or more resources in the runtime system, including taking a first snapshot corresponding to a start of execution a thread and a second snapshot corresponding to an end of execution of the thread, where the first snapshot is taken before the second snapshot; and calculating usage of the resources by the thread based on the snapshots. The threads can be running in a virtual machine and snapshots can be measurements of resources at the operating system level.

21 Claims, 3 Drawing Sheets

THREAD-LEVEL RESOURCE USAGE MEASUREMENT

BACKGROUND

The present application relates to digital data processing, and more particularly to thread-level resource usage measurement.

A runtime system is a code execution environment that executes instructions or code in user requests and that provides runtime services for that code. Core runtime services can include functionality such as process, thread, and memory management (e.g., laying out entities in a memory, managing references to entities, and garbage collecting entities). Enhanced runtime services can include functionality such as error handling and establishing security and connectivity.

One example of a runtime system is a virtual machine (VM). A VM is an abstract machine that can include an instruction set, a set of registers, a stack, a heap, and a method area, like a real machine or processor. A VM essentially acts as an interface between program code and the actual processor or hardware platform on which the program code is to be executed. The program code includes instructions from the VM instruction set that manipulate the resources of the VM. The VM executes instructions on the processor or hardware platform on which the VM is running, and manipulates the resources of that processor or hardware platform, so as to effect the instructions of the program code. In this way, the same program code can be executed on multiple processors or hardware platforms without having to be rewritten or re-compiled for each processor or hardware platform. Instead, a VM is implemented for each processor or hardware platform, and the same program code can be executed in each VM. The implementation of a VM can be in code that is recognized by the processor or hardware platform. Alternatively, the implementation of a VM can be in code that is built directly into a processor.

As an example, a Java source program can be compiled into program code known as bytecode. Bytecode can be executed on a Java VM running on any processor or platform. The Java VM can either interpret the bytecode one instruction at a time, or the bytecode can be further compiled for the real processor or platform using a just-in-time (JIT) compiler.

In addition to Java VMs, other examples of VMs include Advanced Business Application Programming language (ABAP) VMs and Common Language Runtime (CLR) VMs. ABAP is a programming language for developing applications for the SAP R/3 system, a widely installed business application system developed by SAP. The CLR is a managed code execution environment developed by Microsoft Corp. of Redmond, Wash.

When executing, runtime systems create and reference local data entities. When a local entity is no longer being used by a runtime system, the memory being used to store the local entity needs to be reclaimed—i.e., freed or otherwise released and returned to the pool of available memory—so that it can be used to store new data entities. In some environments, programmers must explicitly reclaim the memory they have allocated for local entities (e.g., by explicitly calling functions to free specified sections of memory). In other environments, the reclamation of memory is handled through a technique known as garbage collection.

Garbage collection is a process designed to identify and reclaim blocks of memory that have been dispensed by a memory allocator but that are no longer "live" (i.e., no longer being used, as determined, for example, by not being reachable from any currently referenced objects or entities). Entities that are garbage collected are typically referred to as being "dead" as opposed to being live. Garbage collection is usually handled as a background task by runtime systems rather than as an explicit task by user programs. There are some costs associated with garbage collection, as access to memory must typically be restricted and runtime systems must sometimes be halted during some portions of the garbage collection process.

In a multi-threaded runtime system, threads can misbehave such that they consume too many resources, which can diminish the overall performance of the multi-threaded system and can adversely affect the performance of other threads in the runtime system (e.g., by using scarce resources like memory such that other threads do not have sufficient resources). In the case that threads are non-preemptive threads, threads other than a thread that is misbehaving can be prevented from running. This can severely affect overall system performance and can cause the system to stall and/or crash. Troubleshooting the problem can be challenging, as hundreds of threads can be running at any given time, such that debugging code for each thread to find the thread that is a source of poor performance can be difficult.

SUMMARY

This specification describes methods and apparatus, including computer program products, that implement thread-level resource usage measurement.

In one general aspect, a computer program product tangibly embodied on an information carrier includes instructions operable to cause data processing apparatus to start a thread in a runtime system, where the runtime system is running on top of an operating system, the thread is visible as an independent process to the runtime system, and the thread is not visible to the operating system as part of a thread separate from the process that includes the runtime system; take a first snapshot in the runtime system of resource usage by the runtime system, where the first snapshot is a measurement of operating system resources and corresponds to the start of the thread; end the thread in the runtime system; take a second snapshot in the runtime system of the resource usage by the runtime system, where the second snapshot is a measurement of operating resources, and the second snapshot is taken after the first snapshot and corresponds to the end of the thread; and calculate resource usage of the thread based on snapshots of resource usage by the runtime system, the snapshots including the first snapshot and the second snapshot.

Implementations can include one or more of the following features. The first snapshot can be taken before the start of the thread. The runtime system can be a Java virtual machine. The instructions to start a thread in the runtime system can include instructions to start the thread in response to user direction. The instructions to take a first and second snapshot can include instructions to take the first and second snapshot, in the runtime system, of central processing unit time. The instructions to take the first and second snapshot, in the runtime system, of central processing unit time can include instructions to take the first and second snapshot, in the runtime system, of a process time determined by the operating system on which the runtime system is running.

The instructions to take a first and second snapshot in a runtime system of resource usage can include instructions to take the first and second snapshot, in the runtime system, of memory usage. The instructions to take the first and second snapshot, in the runtime system, of memory usage can include instructions to take the first and second snapshot, in the runtime system, of an amount of main memory in use by the runtime system. The computer program product can further include instructions to take one or more garbage collection snapshots, where the garbage collection snapshots are snapshots of memory usage at garbage collection points and are included in the snapshots (i.e., the snapshots used to compute resource usage). The thread can be a non-preemptive thread. The thread can be implemented as a co-routine in the runtime system.

The instructions to take a first snapshot, take a second snapshot, and calculate resource usage of the thread can include instructions to take the first snapshot, take the second snapshot, and calculate the resource usage in response to a user request to calculate the resource usage. The instructions to take a first snapshot, take a second snapshot, and calculate resource usage of the thread can include instructions to take the first second snapshot, take the second snapshot, and calculate the resource usage of the thread in response to a request from the runtime system. The computer program product can further include instructions to terminate the thread if the runtime system determines that the thread should be terminated based on the resource usage.

In another aspect, a computer program product, tangibly embodied on an information carrier, includes instructions operable to cause data processing apparatus to take a first snapshot of resource usage in a runtime system; start a thread in the runtime system; end the thread in the runtime system; take a second snapshot of the resource usage, the second snapshot taken after the first snapshot and near the ending of the thread; and calculate resource usage of the thread based on a set of snapshots, the set of snapshots including the first snapshot and the second snapshot.

Implementations can include one or more of the following features. The runtime system can be a Java virtual machine. The thread can be a user-level thread. The computer program product can include instructions operable to cause the data processing apparatus to take a first snapshot, take a second snapshot, and calculate resource usage of the thread in response to a user request to calculate resource usage. The computer program product including instructions operable to cause the data processing apparatus to take a first snapshot, take a second snapshot, and calculate resource usage of the thread can include instructions operable to cause the data processing apparatus to take the first snapshot, take the second snapshot, and calculate the resource usage of the thread in response to a request from the runtime system.

The computer program product can further include instructions operable to cause the data processing apparatus to terminate the thread if the runtime system determines that the thread should be terminated based on the resource usage of the thread. The first and second snapshots can be based on values obtained from a native operating system on which the runtime system is running.

The instructions operable to cause data processing apparatus to take a first and second snapshot in a runtime system of resource usage can include instructions operable to cause the data processing apparatus to take the first and second snapshot, in the runtime system, of central processing unit time. Those instructions can include instructions operable to cause the data processing apparatus to take the first and second snapshot, in the runtime system, of a process time determined by a native operating system on which the runtime system is running.

The instructions operable to cause data processing apparatus to take a first and second snapshot in a runtime system of resource usage can include instructions operable to cause the data processing apparatus to take the first and second snapshot, in the runtime system, of memory usage of a memory. Those instructions can include instructions operable to cause the data processing apparatus to take the first and second snapshot, in the runtime system, of an amount of main memory in use by the runtime system. The computer program product can further include instructions operable to cause the data processing apparatus to take one or more garbage collection snapshots, the garbage collection snapshots being snapshots of memory usage at garbage collection points and being included in the set of snapshots.

The thread can be a non-preemptive thread. The thread can be implemented as a co-routine in the runtime system.

In another aspect, a runtime system is operable to perform operations including running threads, where a thread is initiated by an application program running in the runtime system and the runtime system is running on top of a native operating system; taking snapshots of usage of one or more resources in the runtime system, where the snapshots include a first snapshot corresponding to a start of execution of a first thread and a second snapshot corresponding to an end of execution of the first thread, and where the first snapshot is taken before the second snapshot and snapshots are measurements of operating system resource usage by the runtime system; and calculating usage of the resources by the first thread based on the snapshots.

Implementations can include one or more of the following features. The runtime system can be a Java virtual machine. Taking snapshots of usage of the resources can include detecting temporary measurements of the resource usage. Taking snapshots of usage of one or more resources can include taking snapshots, in the runtime system, of central processing unit time. Taking snapshots, in the runtime system, of central processing unit time can include taking snapshots, in the runtime system, of a process time determined by the native operating system on which the runtime system can be running.

Taking snapshots of usage of one or more resources can include taking snapshots, in the runtime system, of memory usage of a memory. Taking snapshots can include taking one or more garbage collection snapshots, where the garbage collection snapshots are snapshots of memory usage at garbage collection points and are included in the snapshots of usage of the resources. Taking snapshots can include taking one or more garbage collection snapshots, where the garbage collection snapshots are snapshots of memory usage at garbage collection points, and taking one or more garbage collection snapshots can include restarting measurement of the usage of the resources; and where calculating usage of the resources by the first thread based on the snapshots can include calculating a difference of resource usage between a current snapshot and a previous snapshot. The first thread can be a non-preemptive thread.

The thread-level resource usage measurement described here can be implemented to realize one or more of the following advantages.

Resource usage can be measured at the thread level. By providing measurement of resource usage at the thread level, threads can be troubleshot in a multi-threaded environment where hundreds of threads can obfuscate a thread that is a source of poot performance. Threads can be analyzed to improve performance of an overall process by improving performance of each thread.

In a development environment, thread level resource measurement can be used to test performance of different implementations of a same project. For example, implementations of a project can each run as a thread and these can be compared. Different resources can be measured, such as processing time, memory usage, file input/output (I/O), load, and the like.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference numbers and designations in the various drawings indicate like elements.

DETAILED DESCRIPTION

Client/Server System

Figure 1:
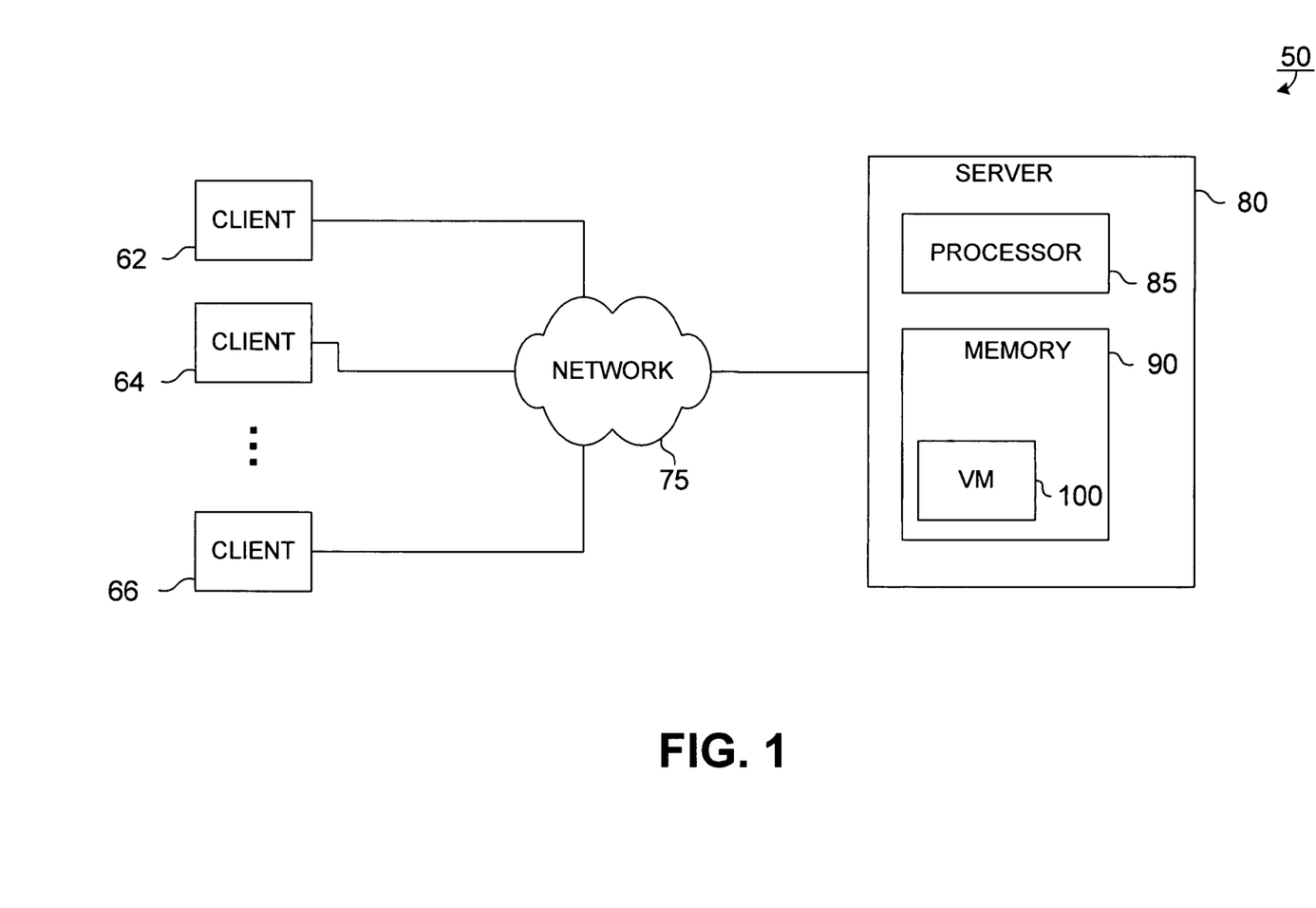
FIG. 1 is a block diagram of an exemplary client/server system.

FIG. 1 illustrates a client/server system 50 in which a network 75 links a server 80 to client systems 62, 64, and 66. The server 80 is a programmable data processing system suitable for implementing apparatus, programs, or methods in accordance with the description. The server 80 provides a core operating environment for one or more runtime systems that process user requests. The server 80 includes a processor 85 and a memory 90. The memory 90 can be used to store an operating system, a Transmission Control Protocol/Internet Protocol (TCP/IP) stack for communicating over the network 75, and machine-executable instructions executed by the processor 85. In some implementations, the server 80 can include multiple processors, each of which can be used to execute machine-executable instructions. The memory 90 can include a shared memory area 92 that is accessible by multiple operating system processes executing in the server 90. An example of a suitable server that can be used in the client/server system 50 is a Java 2 Platform, Enterprise Edition (J2EE) compatible server (Java virtual machine specification available from Sun Microsystems, Santa Clara, Calif.), such as the Web Application Server developed by SAP AG of Walldorf (Baden), Germany (SAP), or the WebSphere Application Server developed by IBM Corp. of Armonk, N.Y.

Client systems 62, 64, and 66 can execute multiple applications or application interfaces. Each instance of an application or an application interface can constitute a user session. Each user session can generate one or more requests to be processed by the server 80. The requests can include instructions or code to be executed on a runtime system (e.g., the virtual machine 100) on the server 80.

Thread-Level Resource Measurement

In a runtime system, resource usage can be useful for many purposes. For example, resource usage of a thread can be used to determine whether a thread is misbehaving (and terminate misbehaving threads), to debug applications, to improve performance of applications, and the like. VMs will be used to discussed resource usage measurement. However, similar techniques can be used in other types of runtime systems.

Some VMs may be multi-threaded. A thread is essentially placeholder information that enables a program to handle multiple concurrent users or service requests within a single use of a program. From the program's point-of-view, a thread can be the information needed to serve one individual user or a particular service request. If multiple users are using the program concurrently or if the program receives concurrent requests, a thread is generated and maintained for each such user or request. The thread allows the program to know which user or request is being served as the program alternatively gets re-entered on behalf of different users or requests.

Threads can be simulated by a user-level mechanism. Employing a user-level mechanism to simulate threads is sometimes referred to as providing "green thread" functionality. As such, a thread can either be a "green" or native thread. Green threads are user-level threads that can be scheduled by a VM rather than by the operating system (OS). Because a green thread is not a native OS thread, a green thread cannot be seen from the point of view of the native OS and can only be seen from the point of view of a VM (although the green thread can be seen from the thread scheduler of a VM)

One mechanism that can be used to simulate threads is OS co-routines. Co-routines are similar to threads, except that the programmer (rather than the OS) takes care of scheduling between co-routines. Threads that are used to implement VM threads can thus be mapped to co-routines. All data structures related to thread management and scheduling, including a threads' call stacks, mutexes, and condition variables for Java monitors, can be kept in a VM's session memory. In the case of a Java VM, that can include both Java stacks and C stacks used by the VM implementation (e.g., for the Java Native Interface (JNI) implementation of dynamic method invocation).

OSs typically schedule threads preemptively in order to maximize fairness (i.e., in order to give each thread a chance to run at some point). In contrast, co-routine scheduling, which is handled by the programmer, is usually not preemptive. That is not necessarily a drawback, however, because request throughput can be more important than fairness. Request throughput, which is a primary objective for scalability, can be maximized by using a batch processing strategy to schedule co-routines. In a batch processing strategy, within each VM, each co-routine yields cooperatively to a scheduler (sometimes still referred to as a thread scheduler) when entering a wait state (e.g., when blocking on I/O or on a monitor such as a Java monitor). Coordination between blocking I/O calls and the thread scheduler can be included as part of the I/O redirection mechanism described above. Mutexes and condition variables can be implemented without using OS locking primitives as scheduler-controlled variables in session memory.

Figure 2:
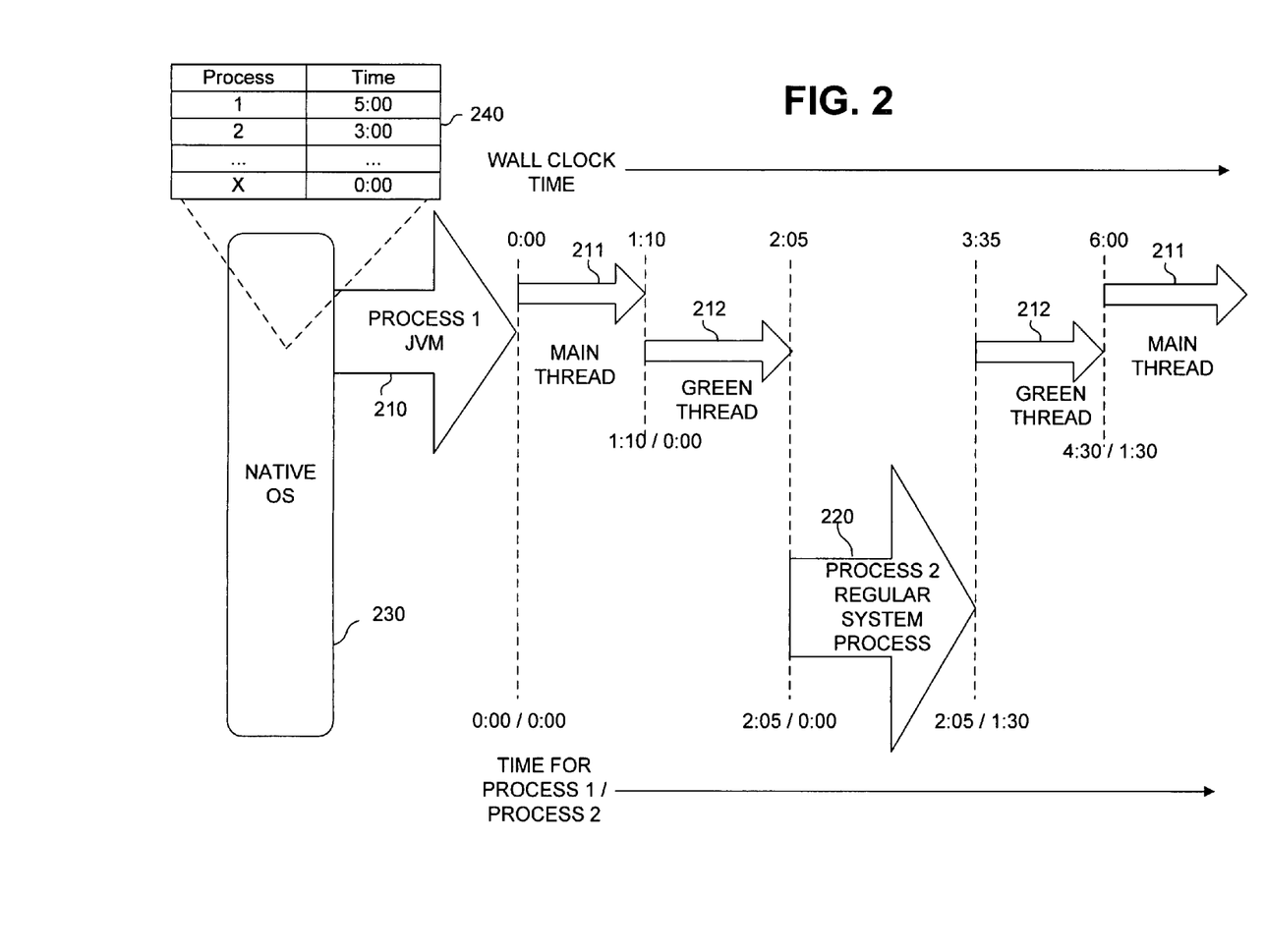
FIG. 2 is an illustration of multiple processes running on a native operating system.

FIG. 2 is an illustration of multiple processes 210 and 220 running on a native OS 230. As mentioned above, statistics of resource usage can be useful. FIG. 2 will be used to describe how resource usage of a thread can be measured. From one side of the illustration to the other, times are indicated at the top and the bottom. The times are indicated in the format "minutes: seconds". The top of the illustration includes what is known as wall clock time, which corresponds to the actual time in the real world. Wall clock time can be maintained by the native OS 230.

The bottom of the illustration includes process times (also referred to as CPU time or system time) that indicate a time, from zero, of how long a process has been running on a CPU. At the bottom, the times of a first and second process 210 and 220 are separated by a slash, where the time before the slash represents the process time of the first process 210 and the time after the slash represents the process time of the second process 220. Process time for a process starts or stops when processes are switched. Process time can be maintained by the OS 230 in a table 240 of process times. In the illustration, dotted lines represent process or thread switches.

The first process 210 is a process that is running a Java VM. The VM running on the first process 210 starts at wall clock time 0:00 and process time 0:00. The thread running on the process from wall clock time 0:00 to 1:10 is the main thread 211. At wall clock time 1:10, a new thread 212 is generated (e.g., created) and that thread runs on the process 210. The thread 212 that is generated is a green thread. The green thread 212 that is generated is a non-preemptive green thread such that the thread 212 runs on the first process 210 until the thread terminates or relinquishes control to another thread. A user can generate the green thread 212. For example a user program can include instructions (e.g., source code compiled to bytecode) requesting that the thread 212 be generated, and the thread 212 can be generated. Then the program can include instructions requesting that the thread 212 start running, at which point control switches to the user-generated thread 212.

The green thread 212 starts at process time 1:10 and runs until process time 2:05 at which the processes that are running on the native OS 230 are switched. When the processes are switched, the process time stops running for the first process 210 and the process time is maintained in the table 240. When the second process 220 starts running, the process time is kept separate for the second process 220 from the process time maintained for the first process 210. As such, the first process time can accurately reflect the length of time that the first process 210 is running.

When the processes are switched again at wall clock time 3:35, such that the first process 210 starts running again, the process time for the first process 210 starts running again. The first process 210 continues with the green thread 212, as it was the last thread running on the first process 210.

The green thread 212 continues running until wall clock time 6:00, when the green thread 212 either relinquishes control or stops running (e.g., terminated or voluntarily stops). When the green thread 212 stops running (i.e., ends) a thread switch is made to the main thread 211.

As shown in FIG. 2, resource usage can be measured at the thread level. Resource usage can be monitored and reported at certain points in a thread's life, or resource usage can be calculated for the whole life of the thread. Measuring resources at the thread level involves taking snapshots of resource usage at various points in the life of a thread. Mechanisms and/or techniques can be used to ensure that other threads do not tamper with the state of resource usage between snapshots such that accurate measurement of resource usage and/or consumption can be derived from the snapshots. To ensure accurate measurement of resources at the Java VM running on the first process 210, non-preemptive threads are implemented. This can ensure that other threads do not interfere with resources and change the state of resource usage. An important aspect of this is that the VM can be "rollable" such that the VM can only be rolled out at certain points. Thus, the points at which resource usage can change can be predicted and modifications can be made to adjust for these points. Also, snapshots can be taken at selectively chosen times where a system can ensure little or no interference of resources (i.e., when it can be expected that no interference will occur).

Snapshots can be taken before the creation of a thread and after a thread has ended (e.g., terminated). Then, at selectively chosen events at which resource usage can change such that a calculation based on the creation and ending snapshots alone would be significantly inaccurate; further snapshots can be taken and those snapshots, in conjunction with the other snapshots, can be used to calculate resource usage accurately. Depending on a type of resource, the snapshots need not be taken before creation of a thread and after a thread has ended (e.g., for processing time resource usage does not significantly change between before and after creation, or before and after termination of a thread).

Resource usage for the life of a thread can be calculated at the end of a thread, or a running measurement of resource usage can be maintained at each point in the life of a thread at which the usage can change. Calculating resource usage can involve subtracting an earlier measurement of resource usage that represents a first state of the system when the thread was generated (before or after generation, depending on the resource and/or metric), from a later measurement of resource usage that represents a second state of the system when the thread ended (before or after ending, depending on the resource and/or metric). If multiple snapshots are taken, when each snapshot is taken a running measurement of resource usage can be maintained. For example, in Java, garbage collection can significantly change resource usage for measurement of memory. Thus, snapshots can be taken at the start of a thread, at garbage collection points, and at the end of the thread. At each garbage collection point the snapshots can be used to calculate a running measurement of resource usage. A running measurement can be advantageous as multiple snapshots need not be stored and later used to calculate resource usage of a thread. Alternatively, to measure resource usage while a thread is running, a first snapshot and a snapshot at the time the resource usage is to be measured can be used to compute resource usage.

Snapshots can be taken by a runtime system and resource usage can be calculated by the runtime system. For example, a VM can be modified such that, based on thread creation and ending of threads, snapshots can be taken. In one example implementation, the thread scheduler in a VM that schedules green threads can perform the measurement of threads. Advantageously, because the thread scheduler is "aware" of the state of a thread (i.e., knows when a thread starts, ends, and the like), the scheduler can accurately measure thread resource usage. Other techniques and/or mechanisms can be used to take snapshots and calculate resource usage.

Types of resources that can be measured at the thread level include processing time (i.e., how much time a thread has run), memory consumption (i.e., how much memory is has been used by the thread), file I/O (e.g., amount of file writes and/or reads, amount of bytes written and/or read, and the like), information about the load on the system (i.e., a comparison of wall clock time and processing time, which can be used to determine, for example, if the system is switching processes a lot if there is a significant difference between a difference in wall clock time and processing time), and the like. To measure resource usage (i.e., take snapshots) of these resources, at a VM (e.g., a Java VM), the VM can call code that is compatible with a native OS (or other platform dependencies) such that certain measurements from the native OS can be used. For example, OS specific code can be written on a Microsoft Windows platform, a UNIX platform, and a LINUX platform and the code can be compiled for those platforms. A VM can call that code to advantageously use resource usage measurements that are measured via the native OS.

As shown in FIG. 2, processing time of the green thread 212 can be calculated based on the process time. Resource usage can be requested by a user program from a thread. The request can be handled by the VM. For example, the main thread 211 can request the resource usage of processing time for the green thread 212. In response to that request, when the green thread 212 starts at process time 1:10, the Java VM can take a first snapshot of processing time. The VM can take the snapshot by calling OS specific code that returns the value 1:10 (i.e., the process time). That value can then be stored.

At process time 4:30 of the first process 210, when the green thread 212 ends, the Java VM can take a second snapshot of process time. Then, based on the two snapshots, the Java VM can calculate the usage of processing time corresponding to the green thread 212 (i.e., resource usage of the thread 212) and return a result of 3:20 (i.e., three minutes and twenty seconds; 4:30-1:10).

Thread level processing time can be measured accurately because non-preemptive threads are used, such that other threads do not consume process time. In addition, resource usage is measured accurately because the measurements taken from the native OS (i.e., the snapshots) were selectively chosen such that a minimal amount of snapshots could be used to calculate resource usage and resource usage was not interfered with by other factors in the environment in which the Java VM runs (e.g., process time is not affected by process switching, so snapshots need only be taken at the beginning and end of the thread).

Although snapshots were taken of process time to generate processing time, in alternative implementations other times, such as wall clock time, can be used to calculate processing time. For example, if wall clock time is used, snapshots can be taken and the beginning and end points of a thread and whenever there is a switch between processes at the native OS. Then, processing time can be calculated based on those snapshots.

A combination of selectively chosen events for taking snapshots, selectively chosen measurements taken by the native OS, and controlling of the environment of the runtime system (e.g., by using non-preemptive threads) can also be used to measure other thread-level resources.

Memory resource usage can also be calculated. Snapshots can be taken (indirectly) on the native OS level as the snapshots can be taken based on memory usage at the native OS level from a garbage collector. A garbage collector can maintain memory statistics, such as watermarks corresponding to memory allocated and memory free such that snapshots can be taken based on the statistics from the garbage collector and memory usage can be calculated (e.g., a snapshot of memory usage can be the difference of memory allocated and memory free, both statistics of which can be available from a garbage collector).

Snapshots that are taken to measure memory usage of a thread can include snapshots taken at the start of the thread and the end of the thread. Because memory usage can be administered in a Java operating environment that includes a garbage collector, snapshots can also be taken at garbage collection points (to avoid garbage collection interfering with accurate measurements). Based on the collection of snapshots, including garbage collection snapshots, memory usage of a thread can be determined. For example, a first snapshot can be taken when the green thread 212 starts and that snapshot can be the value 50 megabytes; then, a second snapshot can be taken at a garbage collection point, right before garbage collection starts, and that snapshot can be 55 megabytes; then a third snapshot can be taken at the end of garbage collection and that snapshot can be 30 megabytes; and then a fourth snapshot can be taken at the end of the green thread 212 and that snapshot can be 45 megabytes. A running measurement of memory usage can first include the difference of the start of the green thread 212 and the start of garbage collection (i.e., 5 megabytes=55-5), and that can be added to the difference between the end of garbage collection and the end of the green thread 212 (i.e., 15 megabytes=45-30) to calculate a second running measurement, which is the total thread memory usage of the green thread 212 (i.e., 20 megabytes=15+5). To ensure accurate measurement when garbage collection snapshots are used, each snapshot of memory includes both live and dead entities that are in a memory.

File I/O, such as a metric corresponding to the amount of bytes written (or read) can also be calculated on the thread level. If file I/O statistics are kept current by an OS, an amount of bytes written can be calculated based on snapshots at the beginning and end of the thread. If such statistics are not kept by the OS, file I/O can be determined by, for example, making calls to code written for specific OSs to take snapshots of amounts of I/O read and/or written between the start and end of file accesses, and aggregating the snapshots to generate a measurement for total file I/O over the life of a thread.

Thread level resource usage measurement can be extremely important in a client/server system, such as the system depicted in FIG. 1, as servers can use thousands of threads to services thousands of requests by clients. As such, statistics that are determined on a process-level might not be helpful, for example, to troubleshoot performance problems, such as misbehaving threads.

Figure 3:
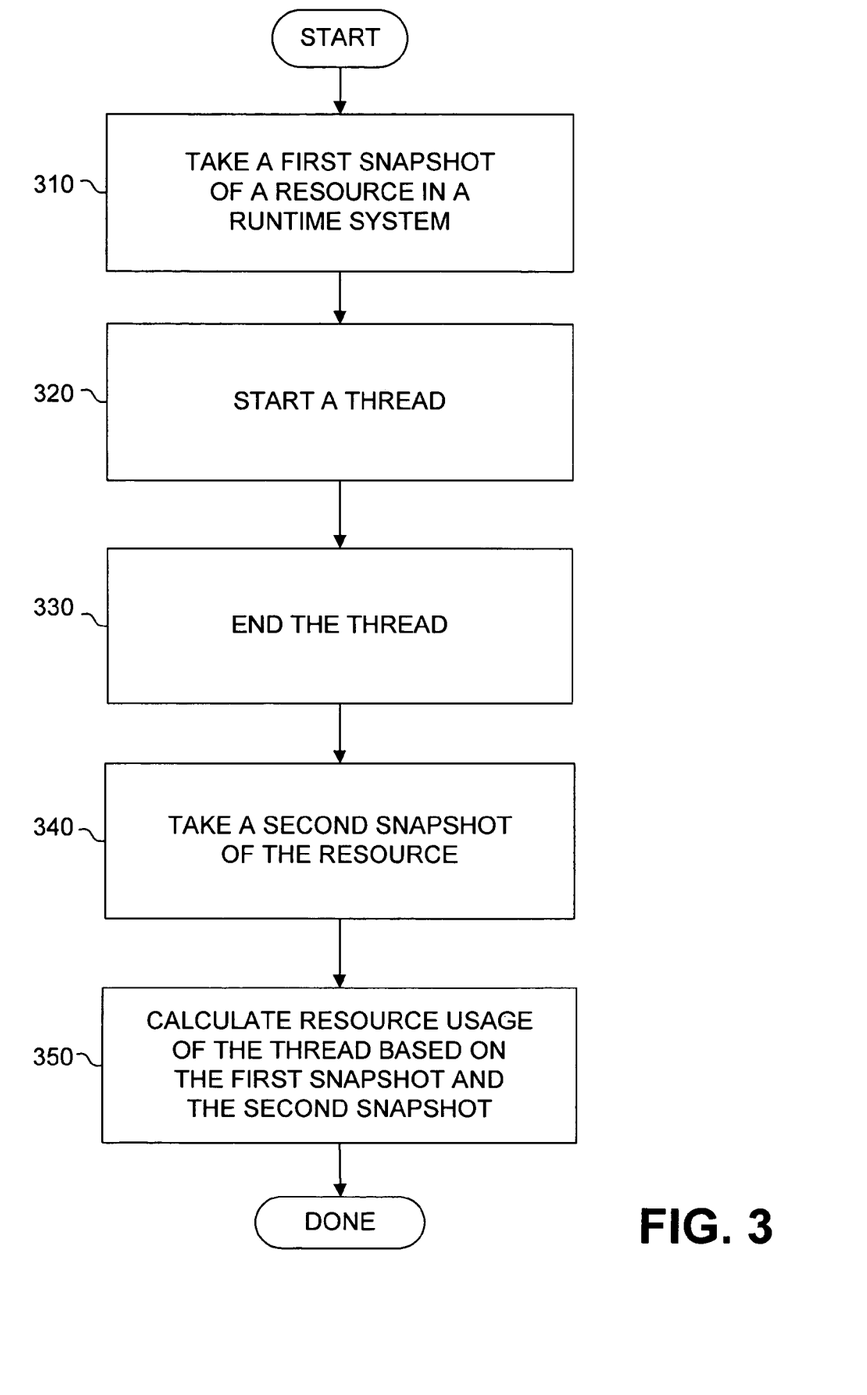
FIG. 3 is a flowchart of a process of measuring resource usage of a thread.

FIG. 3 is a flowchart of a process of measuring resource usage of a thread. The process can be used to measure any type of resource usage by a thread. Resources that are measured can include processing time, memory usage, file I/O, and the like. A first snapshot of a resource is taken in a runtime system (310). The runtime system can be VM, such as a Java VM. The snapshot can be a measurement from a native OS. For example, a VM can call OS specific code to retrieve a measurement of a resource from an underlying OS. Because OSs can differ, the metrics that corresponds to measurements from an OS can differ. In some implementations, the process shown in FIG. 3 can account for that difference by generating the proper metric from the metrics available from a native OS. For example, if a VM has OS specific code for a Microsoft Windows OS and OS specific code for a UNIX OS, and Microsoft Windows has a metric for wall clock time and UNIX has a metric for process time, processing time can be measured by having different implementations for each OS, although measurements received from each OS correspond to different metrics. The first snapshot can be taken by the VM.

At 320, a thread is started. The thread can be a user-level thread (i.e., a thread generated by a user). The thread can be a green thread and that thread can be implemented such that other threads at the runtime system do not preempt the thread. If the thread can be preempted, the component of the runtime system that measures resource usage can take into account any thread switches to calculate resource usage accurately.

At 330, the thread ends. The thread can end voluntarily or involuntarily. For example, the thread may reach an end of execution. As another example, the thread can be terminated.

At 340, a second snapshot of the resource is taken. The second snapshot can be taken using the same techniques and/or mechanisms used to take the first snapshot.

At 350, resource usage is calculated at the thread level based on the first snapshot and the second snapshot. For example, if each snapshot of the resource includes process time and each snapshot corresponds to processing time (i.e., a desired resource usage measurement), processing time can be calculated based on a difference of two process times.

Although FIG. 3 shows a situation where only two snapshots are taken and only those two snapshots are used to calculate resource usage, in alternative implementations additional snapshots can be taken. For example, if memory usage is to be measured for a thread in a Java VM, garbage collection points that occur while the thread is running can be taken into account. To take the garbage collection points into account, additional snapshots can be taken at the garbage collection points and those additional snapshots can be used to calculate resource usage.

The disclosed subject matter and all of the functional operations described herein can be implemented in digital electronic circuitry, or in computer software, firmware, or hardware, including the structural means disclosed in this specification and structural equivalents thereof, or in combinations of them. The disclosed subject matter can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described herein, including the method steps of the disclosed subject matter, can be performed by one or more programmable processors executing one or more computer programs to perform functions of the disclosed subject matter by operating on input data and generating output. The processes and logic flows can also be performed by, and apparatus of the disclosed subject matter can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosed subject matter can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed subject matter can be implemented in a computing system that includes a back-end component (e.g., a data server), a middleware component (e.g., an application server), or a front-end component (e.g., a client computer having a graphical user interface or a Web browser through which a user can interact with an implementation of the disclosed subject matter), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the process of FIG. 3 is shown as being composed of a certain number and type of processes, different processes, additional and/or fewer processes can be used instead. Similarly, the processes need not be performed in the order depicted. Thus, although a few implementations have been described in detail above, other modifications are possible. Other implementations may be within the scope of the following claims.

The following is claimed:

1. A machine-readable storage medium containing instructions that, when executed, cause a machine to:
    start a user-level simulated thread scheduled by a runtime system, hereinafter a "green thread", the runtime system running on top of an operating system, the green thread being visible to the runtime system as an independent process and not being visible to the operating system as part of a thread separate from a second process that includes the runtime system;
    take a first measurement of operating system resources used by, and corresponding to the start of, the green thread;
    end the green thread in the runtime system;
    take a second measurement of the operating system resources, after the first measurement and corresponding to the end of the green thread; and
    calculate the operating system resources usage of the green thread based on the first and second measurement.

2. The machine-readable storage medium of claim 1, wherein the first measurement is taken before the start of the green thread.

3. The machine-readable storage medium of claim 1, wherein the runtime system is a Java virtual machine.

4. The machine-readable storage medium of claim 1, wherein the instructions to start a green thread in the runtime system comprise instructions to: start the green thread in response to user direction.

5. The machine-readable storage medium of claim 1, wherein the instructions to take a first and second measurement comprise instructions to: take the first and second measurement, in the runtime system, of central processing unit time.

6. The machine-readable storage medium of claim 5, wherein the instructions to take the first and second measurement, in the runtime system, of central processing unit time comprise instructions to: take the first and second measurement, in the runtime system, of a process time determined by the operating system on which the runtime system is running.

7. The machine-readable storage medium of claim 1, wherein the instructions to take a first and second measurement in a runtime system comprise instructions to: take the first and second measurement, in the runtime system, of memory usage.

8. The machine-readable storage medium of claim 7, wherein the instructions to take the first and second measurement, in the runtime system, of memory usage comprise instructions to: take the first and second measurement, in the runtime system, of an amount of main memory in use by the runtime system.

9. The machine-readable storage medium of claim 7, further comprising instructions to: take one or more garbage collection measurements, the garbage collection measurements being measurements of memory usage at garbage collection points.

10. The machine-readable storage medium of claim 1, wherein the green thread is a non-preemptive thread.

11. The machine-readable storage medium of claim 1, wherein the green thread is implemented as a co-routine in the runtime system.

12. The machine-readable storage medium of claim 1, wherein the instructions to take a first measurement, take a second measurement, and calculate resource usage of the green thread comprise instructions to: take the first measurement, take the second measurement, and calculate the resource usage in response to a user request to calculate the resource usage.

13. The machine-readable storage medium of claim 1, wherein the instructions to take a first measurement, take a second measurement, and calculate resource usage of the green thread comprise instructions to take the first measurement t, take the second measurement, and calculate the resource usage of the green thread in response to a request from the runtime system.

14. The machine-readable storage medium of claim 13, wherein the machine-readable storage medium further comprises instructions to terminate the green thread if the runtime system determines that the thread should be terminated based on the resource usage of the green thread.

15. A method composing:
running a user-level simulated thread scheduled by a routine system, hereinafter a "green thread", the runtime system running on top of a native operating system, the green thread being visible to the runtime system as an independent process and not being visible to the operating system as part of a thread separate from a second process that includes the runtime system;
taking measurements of usage of one or more resources in the runtime system, the measurements comprising a first measurement corresponding to a start of execution of a first green thread and a second measurement corresponding to an end of execution of the first green thread, wherein the first measurement is taken before the second measurement and measurements are measurements of operating system resources usage by the first green thread; and
calculating usage of the resources by the first green thread based on the first and second measurement.

16. The method of claim 15, wherein taking measurements of usage of the resources comprises detecting temporary measurements of the resource usage.

17. The method of claim 15, wherein taking measurements comprises: taking measurements, in the runtime system, of a process time determined by the native operating system on which the runtime system is running.

18. The method of claim 15, wherein taking measurements of usage of one or more resources comprises: taking measurements, in the runtime system, of memory usage of a memory.

19. The method of claim 18, wherein taking measurements comprises: taking one or more garbage collection measurements, the garbage collection measurements being measurements of memory usage at garbage collection points and being included in the measurements of usage of the resources.

20. The method of claim 15, wherein taking measurements comprises taking one or more garbage collection measurements, the garbage collection measurements being measurements of memory usage at garbage collection points, and wherein taking one or more garbage collection measurements comprises restarting measurement of the usage of the resources; and wherein calculating usage of the resources by the first green thread based on the measurements comprises calculating a difference of resource usage between a current measurement and a previous measurement.

21. A computing system comprising:
a runtime system to take measurements of usage of one or more operating system resources, the measurements comprising a first measurement corresponding to a start of execution of a user-level simulated thread scheduled by a runtime system, hereinafter a "green thread", a second measurement corresponding to an end of execution of the green thread, and a number of measurements taken between the first measurement and the second measurement, wherein the first measurement is taken before the second measurement and wherein each measurement corresponds to a point in a life of the green thread, and wherein the runtime system calculates the usage of the one or more resources by the green thread based on the measurements;
an application program unit running in the runtime system, the application program unit to start a set of threads; and
a storage unit to store the measurements and the calculated usage of the one or more resources used by the green thread based on the measurements.

* * * * *

UNITED STATES PATENT AND TRADEMARK OFFICE
CERTIFICATE OF CORRECTION

PATENT NO. : 7,624,395 B2
APPLICATION NO. : 10/949543
DATED : November 24, 2009
INVENTOR(S) : Jan Dostert It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1431 days.

Signed and Sealed this

Twenty-sixth Day of October, 2010

David J. Kappos
*Director of the United States Patent and Trademark Office*